May 4, 1954 R. E. McCOY ET AL 2,677,723

COLOR TELEVISION

Filed May 4, 1950 2 Sheets-Sheet 1

INVENTORS:
Meyer Kalfaian
BY Robert E. McCoy

INVENTORS:
Meguer Kalfaian
Robert E. McCoy

Patented May 4, 1954

2,677,723

UNITED STATES PATENT OFFICE 2,677,723

COLOR TELEVISION

Robert E. McCoy, Portland, Oreg., and Meguer Kalfaian, Los Angeles, Calif.; said Kalfaian assignor to said McCoy Application May 4, 1950, Serial No. 160,042

15 Claims. (Cl. 178—5.4)

Our present invention relates to color television, and particularly to receiving equipment for those systems in which the signals representing different primary colors are transmitted sequentially. Its main object is to provide electronic means for switching colors, thereby enabling a cathode-ray picture tube to produce images in all colors on its screen.

Further objects are: to produce colored pictures with a relatively simple tube structure, employing only one picture tube and only one electron beam within that tube; to combine or superimpose images in three primary colors on a single screen; to accomplish color switching in the picture tube itself, rather than in any auxiliary tube; to provide means for changing colors rapidly, even as rapidly as may be required in a "dot sequential" color television system; and, incidentally, to provide simple and efficient circuits for controlling the color-switching means.

Generally, according to our invention, the path of the electron beam within the picture tube is modified slightly, at appropriate times, to change the color of light produced when the beam strikes the screen. Ideally, the path modification should occur in abrupt steps, to make definite the switching from one color to the next in sequence. This would require a rectangular stair-step wave of current or voltage for control purposes; and the ideal waveform is unattainable, particularly at the high frequencies required by a dot-sequential system. Accordingly, additional objects of our invention are: to provide a simple approximation to the ideal waveform; and to provide means for suppressing the beam at moments when incorrect colors might be produced because of deviation (beyond tolerable limits) from the ideal color-control waveform.

Various forms of our invention are illustrated in the accompanying drawings, in which.

In describing embodiments of our invention, we shall first show their application to a typical dot-sequential system using the three primary colors red, blue and green, then point out the differences required in various details for application to other color systems. Depending on the standards finally adopted, the fundamental color-switching frequency for a dot-sequential system is likely to fall in the range from 3 to 9 megacycles per second. For brevity, call this frequency $f_d$. Then, during one cycle at frequency $f_d$, signals are transmitted to represent one picture element or "dot" of each color—red, blue and green—in turn. These signals are received and detected in a conventional manner. Synchronizing pulses, which the transmitter periodically (during the "fly-back" interval of each scanning cycle) substitutes for visual-data signals, are separated and used to control the timing of the two sweep generators that drive horizontal and vertical deflection coils mounted outside the neck of the cathode-ray tube (or plates inside the neck, in case of electrostatic deflection), also in a conventional manner. In the neck of the cathode-ray tube, near the base, is an electron gun producing a beam of electrons directed past the deflection coils toward the large end of the tube. Intensity of the beam is controlled by video-frequency signals from the radio receiver, applied to a control electrode in the electron gun.

Up to this point in the description, the features mentioned could be of any known types suitable for their respective purposes. The particular choice of items is no part of our invention, and details are indicated only as a reminder of the functions taken for granted in any television system, whether monochrome or color. To complete the receiving arrangement for monochrome television, the cathode-ray tube might have, at its large end, a fluorescent screen with uniform color (preferably white) of fluorescence. This screen would be placed substantially perpendicular to the direction of the electron beam. For color television according to the embodiments of our invention shown in Figure 1, the cathode-ray tube will have a screen divided into sections or stripes that display different colors of light when struck by the electron beam.

*Screen with horizontal stripes*

Figure 2:
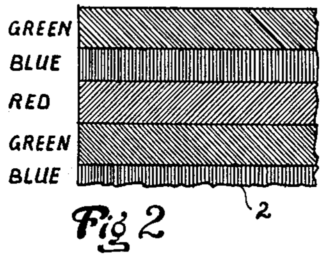
Figure 2 is a front view of the striped screen.

One form of striped screen is illustrated in Figure 2. For the sake of clarity, only a few broad stripes are drawn; but in practice there would be several hundred narrow stripes of each color, a complete set of three colored stripes (red, blue and green) corresponding to each horizontal line in the picture-scanning raster. For example, if the color-television system follows the standards of present monochrome systems, there will be some 500 sets of horizontal stripes (525, less 5% lost during vertical retrace) in the height allotted to the picture. To an observer viewing the screen from a moderate distance, individual stripes will be indistinguishable because of their narrowness.

Stripes can be produced by using a striped color filter on the side from which the screen is to be viewed, with a white phosphor on the side exposed to the electron beam; or three different phosphors can be deposited in a striped pattern, each phosphor being chosen for its ability to produce light of a single color (red, blue or green). The latter course is generally preferable, since higher luminous efficiency and greater brilliance may be expected when none of the light need be absorbed by filters; but if there is available a phosphor of exceptionally high efficiency in a color slightly different from one of those desired, the over-all efficiency obtained by combining that phosphor with a filter to correct its color may prove better than that of some other phosphors that could produce the desired color without the aid of a filter. Assuming now that the cathode-ray tube 1 in Figure 1 contains a striped screen 2 of the type just described, the color of light made visible depends on the position of the spot where the electron beam strikes the screen. Under control of the conventional sweep system, including coils 3, 3', 4, 4', the beam scans a raster covering the area allotted for the television picture with a series of horizontal lines. By appropriate adjustment of vertical-sweep amplitude, this raster can be so fitted to the pattern of horizontal stripes on screen 2 that the normal path of the scanning spot follows the center of each successive stripe of a particular color—say blue. Video output of radio receiver 5 applied to control grid 6 of cathode-ray tube 1 varies the intensity of the electron beam and so the intensity of the light produced as the beam strikes the screen 2. The result thus far is a monochrome picture; but its color can be changed from blue to red or green by a slight additional vertical deflection of the electron beam. With the color sequence illustrated in Figure 2, a downward deflection would change the color from blue to red, while an upward deflection would make the change to green. Our invention includes means for providing such additional deflection periodically, in synchronism with corresponding changes in the color represented by the visual-data signals being received, so that the proper color of light will be produced by the screen.

For the dot-sequential color system previously mentioned, the color switching process at the receiver must take place at the same fundamental frequency, $f_d$, employed at the transmitter.. This frequency is reproduced by oscillator 7, under control of synchronizing signals that are selected by appropriate circuits in the radio receiver 5. Oscillator 7 drives a frequency doubler, 8, and an amplifier, 9. Doubler 8 also drives amplifier 9; and the resultant amplifier output (at frequencies $f_d$ and $2f_d$) is applied to auxiliary deflection coils 10, 10', thereby causing vertical deflection of the beam as shown by graph 11 in Figure 3. Oscillator 7 also drives a frequency tripler, 12, and output of the tripler (waveform 13 in Figure 3) is applied to control grid 6 of the cathode-ray tube, in addition to the video output of the radio receiver.

Figure 3:
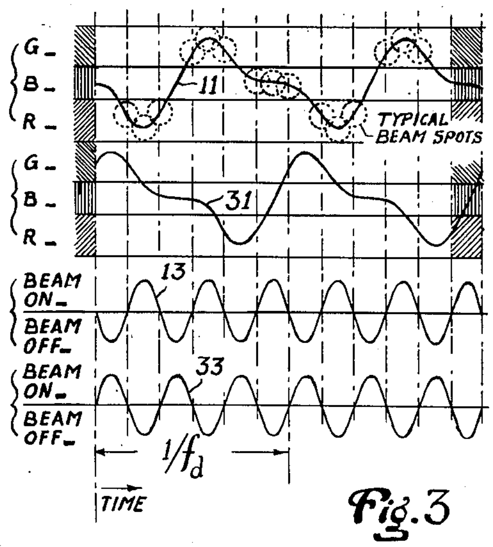
Figure 3 shows waveforms used for color-control and for blanking in a dot-sequential television receiver.

Since the deflection produced by action of the main scanning system varies linearly with time while the beam is sweeping across the screen, distances along the horizontal axis of Figure 3 may be considered to represent either time intervals or the horizontal position of the spot where the beam strikes screen 2. The time interval actually shown in Figure 3 is rather short, comprising only two cycles at frequency $f_d$, and the corresponding distance traversed by the scanning spot is small compared to the width of screen 2; but the same waveforms continue throughout the scanning of each line of the raster.

The D.-C. bias voltage applied between control electrode 6 and cathode 14 of the picture tube is made sufficient to cut off the electron beam by itself, even without the "blanking" voltage provided by frequency tripler 12. During the negative half cycles of tripler output (downward excursions of curve 13 in Figure 3), the voltage at frequency $3f_d$ helps to suppress the electron beam; but during positive half cycles (upward excursions of the curve 13) it counteracts the negative bias so that beam current can flow in accordance with the video signal. By appropriate phasing of the tripler output voltage, the periods when the beam is "on" are arranged to occur when the video signal received represents picture data for one or other of the three colors, while periods when the beam is "off" occur during the transitions from one color to another. This ensures distinct separation of the signals that represent dots of different colors; and it allows a wide tolerance on the waveform of the auxiliary deflection that switches colors in picture tube 1. During the "off" periods, the deflection may vary in any manner whatsoever, without affecting the picture. Only during "on" periods need the auxiliary deflection be accurately controlled.

In terms of resulting beam deflection, the second-harmonic ($2f_d$) component of output from amplifier 9 is made ½ to ⅔ as strong as the fundamental-frequency ($f_d$) component; and phasing of the two components is so adjusted that when the fundamental changes sign, the second harmonic does likewise. This makes the auxiliary deflection vary cyclically in a pattern closely resembling a flight of stairs with three steps. The amplitude of deflection is so adjusted that the beam position corresponding to the flat portion of each step lies in the middle of a different colored stripe on the screen. Graph 11 illustrates the case in which the deflection at second harmonic is half that at the fundamental frequency. Corresponding positions of three adjacent color stripes are shown in Figure 3 by crosshatching with a different slant for each color. Theoretically, the vertical variation within the central portion of each step will be a minimum when the harmonic ($2f_d$) component of deflection is about 58% of the fundamental ($f_d$); but in practice, the exact amplitude ratio is not critical.

Phase relations of the blanking voltage (curve 13) and the auxiliary deflection (curve 11) are so adjusted that the beam is "on" only during the central portion of each deflection step. As a result, there is very little vertical motion of the scanning spot while it is on any one stripe; and the spot may occupy almost the full vertical width of a stripe without risk of overlapping onto adjacent stripes of different color. Vertical width of the two extreme stripes in each set of three can be made slightly greater than that of the central stripe, as shown in Figure 3, to offset the greater vertical movement of the spot while it is on the two extreme stripes. Then the margin of safety against overlap will be substantially the same for all three steps of deflection.

A system employing a number of primary colors different from three can be provided by using a screen with corresponding colored stripes, changing the frequency multiplication used to produce blanking voltage, and changing the number of harmonics combined in amplifier 9. In general, if the number of colors is $n$, the blanking frequency should be $nf_d$, and the auxiliary deflection should have components at frequencies including all multiples of $f_d$ less than the $n$-th. For minimum vertical variation within the central part of each step, the relative amplitudes of the component deflections should vary inversely with their frequencies, the second harmonic being slightly larger than half the fundamental-frequency component, the third harmonic slightly more than one-third, and so on.

*Screen with vertical stripes*

If a sufficiently high degree of linearity is attained in the horizontal sweep, the general results produced by the arrangement just described (employing a screen with horizontal stripes) can be obtained more simply by employing a screen with vertical stripes. In this alternative arrangement, applicable only to a dot-sequential system, auxiliary deflection is omitted, eliminating parts 8, 9, 10, 10′ from Figure 1. Cathode-ray tube 1 is essentially the same as before, but is rotated 90° on its axis to make the stripes in Figure 2 vertical instead of horizontal; and stripe width is the same for all three colors. The required number of stripes of each color now corresponds to the number of dots per line, rather than to the number of lines per frame.

The nominal number of dots per line is $f_d/f_h$, multiplied by the dot-interlace ratio. The net number of dots will be somewhat smaller, of course, because of those lost during horizontal retrace. If dot interlace is not used (dot-interlace ratio 1:1), the horizontal sweep amplitude is so adjusted that the time in which the beam crosses a set of three different-colored stripes is $1/f_d$. The beam is blanked out at frequency $3f_d$, under control of frequency tripler 12 (or of oscillator 7, if the oscillator frequency be changed from $f_d$ to $3f_d$), at the times when it would otherwise strike parts of two adjacent stripes simultaneously. Graphs 11 and 13, in Figure 3, show the sequence of stripe colors and blanking, though the color changes in this case are accomplished by motion along a linear path rather than a sinuous one.

To provide dot interlace with 2:1 interlace ratio, color sequence of the stripes is reversed on the screen, and the number of stripes and the sweep amplitude are so adjusted that the beam crosses six stripes (two sets of three) in a time interval $1/f_d$. With the blanking frequency $3f_d$, as before, the beam is blanked out at the centers of alternate stripes. The remaining stripes, forming a group with normal color sequence, function as just explained for operation without dot interlace; but in successive sweeps over the same horizontal line the polarity of blanking voltage will be reversed (as explained below, in connection with synchronization), changing it from the form shown by graph 13 to that shown by graph 33, and the alternate stripes come into use.

The stripes impose limits on the dimensions of the spot covered by the electron beam when it strikes the screen. Without interlace, the spot can have as much as half the width of a stripe and yet not overlap onto either adjoining stripe while the beam is unblanked. With dot interlace, the spot might reach the boundary between two stripes and overlap both stripes before blanking cuts off the beam. Overlap can be prevented by introducing black stripes between the colored ones and making the spot width no more than the width of a black stripe, or by making the blanking voltage so large that the beam is extinguished just before its edge crosses the boundary between colored stripes. In any case, the spot width must be less than the width of a colored stripe if false colors are to be prevented entirely. Fortunately, a small amount of overlapping can be tolerated, so long as it occurs symmetrically, since its effect then is merely to make the colored image look pale, as if the primary colors were partly replaced by white light; for example, extreme overlap of the scanning spot would make the image of red look pink.

Since the width of a colored stripe is less than the height or width of a 3-colored picture element, the scanning spot might well be made oblong, with dimensions lengthwise of the stripes 3 to 6 times its maximum dimension parallel to the width of a stripe. Under any given operating conditions, only a limited current density can be readily attained in the electron beam. Accordingly, use of an oblong spot, aligned with the stripes on the screen and covering substantially all the space allowable for it, leads to maximum beam current. This provides maximum brightness of the picture, besides distributing the light over the screen in a way that tends to minimize flicker. Suitable elongation of the spot can be produced simply by changing the shape of apertures in the electron gun, or generally making the gun elliptical where it ordinarily would be made circular.

*Finned screen*

Figure 5:
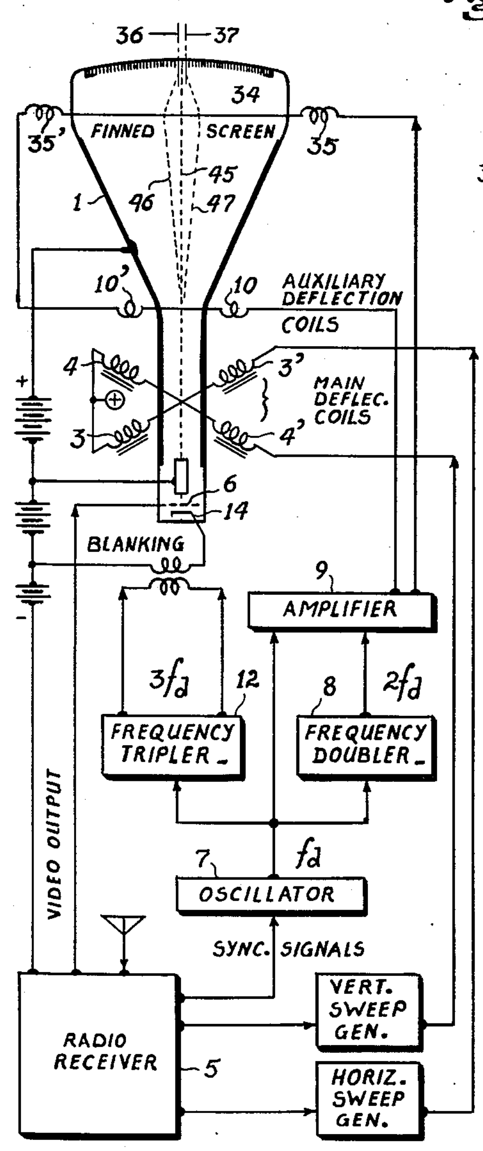
Figure 5 is a schematic diagram of a color-television receiver employing a picture tube with finned screen.

A preferred embodiment of our invention is shown schematically in Figure 5. The cathode-ray tube in this case has a finned screen, 34; and two sets of auxiliary deflection coils are used with it: a small set, 10, 10′, near the coils of the conventional sweep system, and a large set, 35, 35′, closer to the screen.

Figure 7:
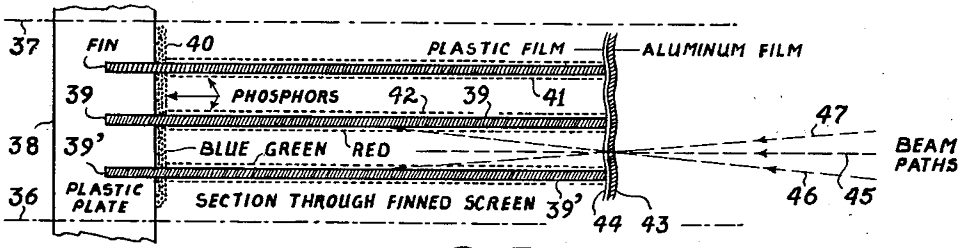
Figure 7 is an enlarged view of a small section through the finned screen, between lines 36, 37 of Figure 5.
Figure 6:
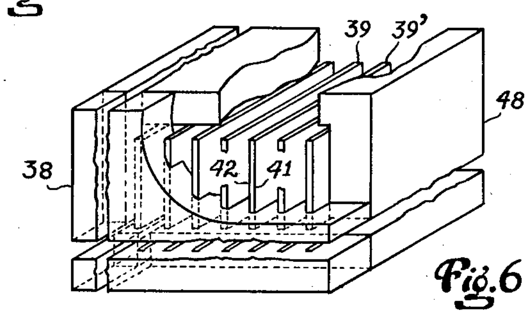
Figure 6 is an exterior view of the finned screen.

Structure of the finned screen is shown more clearly in Figure 6, a front view, and in Figure 7, an enlarged view of a small section between lines 36, 37 in Figure 5. At the front of the screen is a transparent plate, 38, which carries on its rear face a large number of opaque fins, 39, 39′, etc. These fins are attached to a stiff frame, 48, around the edges of the screen, as well as to plate 38. The combination keeps them evenly spaced and parallel. Between fins, the rear face of plate 38 has a phosphorescent coating 40, chosen for its ability to produce light of one color—say blue—when struck by the electron beam. On the left face of each fin is a phosphorescent coating, 41, chosen to produce light of another color—say red. On the right face of each fin is a phosphorescent coating, 42, chosen to produce light of the third primary color—say green. Stretched across the rear edges of the fins is a metal film, 43, thin enough to be penetrated readily by the electron beam, but thick enough to form an efficient reflector for the light from the phosphorescent coatings.

One method of constructing such a screen is as follows: Prepare a great many sheets of thin metal by cutting them to a width slightly greater than the desired height (or width, if the screen is to have horizontal fins) of the screen, and to some convenient length. Coat these sheets (by any of the known methods) with phosphors of two different colors, one on each side. Coating may be done either before or after cutting. Stack the phosphor-coated sheets in a neat pile, separating them with a like number of spacers. These temporary spacers should be made of some material such as wax that can be removed later without damaging the phosphor coatings—for example, material that can be dissolved or melted without dissolving the phosphors, or that can be evaporated or burned (without ash) at a moderate temperature. When the stack reaches a height slightly greater than the desired width (or height) of the screen, clamp it between two sturdy plates somewhat narrower than itself, and compress it to the exact height required. Place a metal plate against each long side of the stack, and weld or solder it to the adjacent edges of all the metal sheets. This permanently establishes the spacing of the metal sheets, at the edges mentioned. Remove the clamping plates. At this stage the side plates should extend above and below the stack a distance approximating their own thickness. Fit two similar plates tightly into the space between the projecting edges and weld or solder them to the side plates. This pulls each sheet taut between the two side plates to which its opposite edges are attached. Now slice the stack, very much as if it were a loaf of bread and the outer plates were its crust. Make the thickness of each slice equal the desired width (front to back) of fins in the screen. In a typical case, the slices from one stack may provide fins for more than a hundred screens; and though the labor of assembling the stack is considerable, the proportionate share charged against each screen will be tolerably small. If a curved screen is desired, the slice can be cut (with a band saw, or the like ) to a suitable curvature in the plane of the sheets; and individual screens can be bent later (after plate 38 is attached), to produce curvature in what was originally the plane of the side plates. Each slice has the form of a grille, with a rectangular frame (48) enclosing a set of fins (39, 39′, etc.). Cut plates of transparent plastic to a size matching each set of fins. Either before or after cutting, coat one side of each such plate (38) with phosphor of the desired color. Grind or etch the exposed edges of each set of fins, if necessary, to remove burrs; then place it against the coated side of a plastic plate, applying heat and pressure until the edges of the fins cut into the plastic slightly and become imbedded to a depth greater than their own thickness. After thus fastening the edges of fins to plate 38, which permanently establishes their spacing, remove the temporary spacers from between them.

If the phosphor coatings show any flaws, upon inspection at this stage, the defective screens can be repaired by washing off the original phosphor and applying a new coat, using a process of settling from an aqueous suspension. Suspended particles of phosphor will settle only on the upper side of any surface exposed to them; and by appropriate orientation of the screen during the settlement period (with some surfaces vertical, or horizontal but face down, to avoid the settling particles), the principal surfaces can be coated independently. When all three coatings appear satisfactory, turn the rear face of the screen upward and lay over the exposed edges of the fins a very thin (say 6 or 7 millionths of an inch) plastic film 44. This may be applied conveniently with the aid of water: submerge the screen, in as little water as possible; place a few drops of plastic solution on the water, where it will spread out evenly and form a film as its solvent evaporates; then drain or evaporate the water until the film settles gently to the desired position. Dry the screen, and mount it in a vacuum chamber. Deposit on the rear face of plastic film 44, by evaporation from a heated wire, a thin film of aluminum (or other metal), 43. Cement the four corners of the screen to the glass faceplate of cathode-ray tube 1, on what is to be the inside, and weld the faceplate to the rest of the tube envelope. (This may be done before metalizing the screen; then the tube envelope will serve as the vacuum chamber during formation of metal film 43.) Subsequent processing of the tube, particularly the outgassing before it is finally sealed, may well be allowed to remove most of plastic film 44 since that film is needed only to provide a smooth surface on which to form metal film 43.

The foregoing description applies to a screen suitable for viewing from the side not exposed to the cathode-ray. As an alternative, plate 38 might be made of metal, welded to the fins; and metal film 43 (and with it plastic film 44) might be omitted. This form of screen would be suitable for viewing from the side exposed to the cathode-ray.

When there is no current flowing through auxiliary deflection coils 10, 10′ and 35, 35′, the electron beam in cathode-ray tube 1 arrives at screen 34 traveling in a direction substantially perpendicular to plate 38 and edgewise with respect to the fins (39, 39′). The beam electrons then pass straight between pairs of adjacent fins and strike the phosphorescent coating 40 on the rear face of plate 38, producing a spot of blue light. The position of this spot on the screen is controlled by curents passing through deflection coils 3, 3′, 4, 4′ of a conventional sweep system, while its intensity is controlled by the video-frequency output of radio receiver 5, which is applied to control grid 6 in the electron gun of cathode-ray tube 1. Thus the result would be a picture on the screen in a single color (blue).

When current does flow through the auxiliary deflection coils, the currents through the two sets of coils (10, 10′ and 35, 35′) are of such polarity and so proportioned that they produce no net change in the position at which the electron beam strikes screen 34; but the combination of two opposite deflections in different regions along the path of the beam changes its direction, its angle of incidence. Suppose the beam, initially directed toward screen 34 along the path indicated by dotted line 45 in Figure 5, is deflected to the left as a result of current in coils 10, 10′. Following a path shown by dotted line 46, it moves progressively farther to the left of path 45 until it comes under the influence of coils 35, 35'; then, being strongly deflected to the right as a result of the current in coils 35, 35', it turns to intersect its original path 45 in screen 34. With sufficient current flowing through the auxiliary deflection coils, the angle between paths 45 and 46 can be made fairly large. In particular, it can be made so large (about 8 or 9 degrees, for the proportions illustrated in Figure 7) that the beam following path 46 strikes only the left faces of the fins it meets at the screen, and never reaches plate 38. Thus a spot of red light is produced, instead of a spot of blue light. In a similar manner, with currents of opposite polarity in the auxiliary deflection coils, the beam path can be modified to that shown by dotted line 47; then the electrons in the beam strike only the right faces of fins, and only green light is produced. The slight fore and aft shift of spot position is partly masked by scattering and reflection of light, within the box formed by two adjacent fins and the film 43 (behind them), so that the apparent spot position moves only a small part of the distance between adjacent fins. Fin spacing is made no larger than the width of the spot; consequently, even to an observer some distance off center (where parallax might be appreciable), the spot appears in substantially the same position whether its light comes from phosphor coating 40 on plate 38, from the coating 41 on fin 39, or from the coating 42 on fin 39'. By appropriate control of the currents through the auxiliary deflection coils, colors can be switched in any sequence and with any timing likely to be required for reproduction of a colored picture.

The two sets of auxiliary deflection coils must have their magnetic axes oriented to make the directions of their individual deflections substantially opposite, and approximately perpendicular to the fins of screen 34, but not necessarily either horizontal or vertical. If the fins are horizontal, their number may be chosen to match the number of horizontal lines used in scanning the picture, so that as the scanning spot passes across the screen it will follow the center of each successive space between adjacent fins; then if the spot is not much wider than the fin spacing, only a small part of the electron beam will be wasted by striking the rear edges of fins, and that fraction will be substantially the same no matter which line is being scanned. Similarly, if the fins are vertical, their number may be chosen to match the number of 3-color dots in a line, so that the position of the spot relative to a pair of adjacent fins will be the same for each successive dot of any particular color. Such arrangements permit use of the minimum number of fins, but require adjustment of the scanning raster to a definite height or width determined by the fin spacing. Alternatively, the number of fins may be made much larger (preferably by at least a factor of two) than the number of horizontal lines or the number of 3-color dots per line; then if the scanning spot is large enough to make full use of the screen space available for each dot, it will always straddle at least one fin; and though the fraction of beam current wasted on the rear edges of fins will vary slightly as the scanning spot sweeps across the screen, the corresponding variation of brightness will be too slight for the human eye to distinguish. When the screen is designed according to this latter alternative, the fins may cross the screen at any convenient angle, since their direction does not appreciably affect the appearance of the picture on the screen. We prefer to make the fins vertical, since they will tend to bend or sag (from their own weight) if arranged horizontally or diagonally.

In a typical 10" screen (picture size 6" x 8", according to present U. S. standards) there might be 800 to 1,000 fins spaced 0.01" to 0.008" apart, each 6" long (vertically), 0.1" wide (front to back) and 0.001" to 0.002" thick. Individual fins will be very flexible (like ribbon), even if made of the stiffest metal known; but when pulled taut by the frame 48 and bonded together (at the front by plate 38 and the back by film 43) the fins assembled into a screen form a fairly rigid structure.

In the receiving arrangement shown by Figure 5, oscillator 7 reproduces the fundamental color-switching frequency ($f_d$) of the dot-sequential system under consideration. It is synchronized with the transmitter by means which will be explained later. This oscillator drives a frequency doubler 8, and an amplifier 9. Doubler 8 also drives amplifier 9; and the resultant output, at frequencies, $f_d$ and $2f_d$, is applied to the two sets of auxiliary deflection coils (10, 10', and 35, 35'). Oscillator 7 also drives a frequency tripler, 12; and tripler output is applied to the cathode, 14, of picture tube 1. Alternatively, tripler output could be applied to control grid 6, as in Figure 1. In either case, it varies the potential difference between grid 6 and cathode 14 at a frequency $3f_d$, as shown by graph 13 of Figure 3. In combination with the D.-C. bias voltage applied between grid 6 and cathode 14, it cuts off the electron beam except for periods of a half cycle or less during upward excursions of the wave, graph 13.

Graph 11 of Figure 3 shows approximately the waveform of current supplied by amplifier 9 to the auxiliary deflection coils. Since the angular deflection produced by each set of coils is proportional to their current, the ordinates of graph 11 are proportional to deflection also. Three relatively flat steps appear in each cycle (at frequency $f_d$) of auxiliary deflection, at times when the beam is "on" (upward excursions of graph 13). For the bottom step, the beam path is bent like line 46 of Figure 5, and the beam produces a spot of red light; for the middle step, the beam path resembles line 45, and blue light is produced; while for the top step, the beam path is bent like line 47, and green light is produced. This sequence is repeated cycle after cycle, in time with corresponding color switching at the transmitter. Choice of deflection waveform for this purpose is governed by two requirements: within the middle step, the maximum deflection should be kept as small as possible; while within the other two steps, the deflection should exceed the minimum required to make the fins completely shade plate 38 from the electron beam. For best results, the amplitude of deflection at second-harmonic frequency ($2f_d$) should be made about 55% of the fundamental-frequency ($f_d$) amplitude; this ratio keeps the middle-step deflection less than 2% of that within the other two steps; but the variations will be scarcely noticeable for any ratio from 50% to 60%.

*Synchronization*

Figure 4:
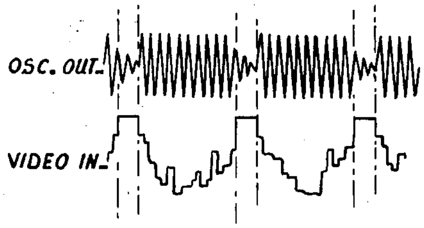
Figure 4 shows schematically a stop-start oscillator, suitable for control of color switching in a dot-sequential color television system.
Figure 4:
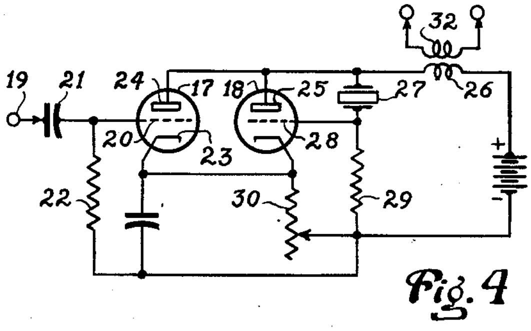

Color synchronization is provided by the circuit shown in Figure 4, which is one of many possible forms for oscillator 7. This employs two electron tubes (shown as triodes, though tetrodes or pentodes might be used), one (17) to sustain oscillations, the other (18) to stop them. To input terminal 19 are applied composite video signals taken from radio receiver 5 at a stage where the synchronizing pulses have positive polarity (e. g., at the input to the final video amplifier). During each pulse, the grid 20 of tube 18 draws current, thus charging capacitor 21. After each pulse, the capacitor starts to discharge through grid-leak resistor 22, but so slowly that it retains sufficient charge to provide a large negative grid bias; and the next pulse will drive grid 20 above the potential of cathode 23 only a very small amount while recharging capacitor 21. Thus the peaks of successive synchronizing pulses at grid 20 are, in effect, clamped at approximately the potential of cathode 23. The amplitude of the applied signals is so adjusted that the anode 24 of tube 18 passes current only during the synchronizing pulses; all picture-data signals at grid 20 fall in the range below cut-off, and have no effect on the anode circuit. Anodes 24, 25 of tubes 17 and 18 are connected in parallel, both being supplied through inductance 26 from the same D.-C. source. A piezo-electric crystal resonator 27 is connected from anode 25 to grid 28 of tube 17, while grid 28 is connected through resistor 29 to a D.-C. source 30 that provides a fixed bias voltage. If tube 18 were absent, this arrangement would be a conventional type of crystal-controlled oscillator; and between synchronizing pulses, when anode 24 draws no current, tube 17 does cause oscillations at a frequency ($f_d$) determined primarily by crystal 27. The circuit parameters, and the fixed bias applied to grid 28 from source 30, are so adjusted that tube 17 maintains the oscillations at a substantially constant amplitude with the tube operating class A (no grid current and no cut-off of plate current). During each synchronizing pulse, while anode 24 of tube 18 draws current it acts as a relatively low A.-C. resistance shunting tube 17. This damps the oscillations severely; and they dwindle to insignificance within the time normally taken by one of the pulses that are transmitted for horizontal-sweep synchronization. At the trailing edge of each synchronizing pulse, the sudden cessation of current to anode 24 (in a time less than $1/f_d$) not only removes the damping effect but provides a strong impulse to restart the crystal-controlled oscillation. Oscillator output may be taken conveniently from a secondary coil 32 coupled to plate-feed coil 26.

Assuming that a similar oscillator is used to control color switching at the transmitting end of the television system, with a crystal resonant at substantially the same frequency, the two oscillators will start practically in unison after each synchronizing pulse; and at the end of a horizontal-sweep period, the phase difference between their respective oscillations will still be negligible, provided that the difference between the two oscillator frequencies is negligible in comparison to the horizontal sweep frequency ($f_h$). Since ⅙ cycle at frequency $f_d$ is significant (the beam "on" period), the frequency tolerance is considerably less than $f_h/6$. For example, with $f_h=15.75$ kc./s. (present U. S. standard for monochrome television), a difference of 500 C. P. S. would be practically imperceptible in its effect on the picture displayed by the receiver. Such a frequency tolerance can be maintained easily by crystals now available.

Any variation in the duration of successive synchronizing pulses produces a corresponding variation in the timing of color switching (which is controlled by the trailing edge of the synchronizing pulse, as explained above) with respect to the horizontal sweep (which is controlled by the leading edge of each horizontal synchronizing pulse), and so shifts the position of color dots along each line of the scanning raster. Dot interlace can be produced simply by introduction at the transmitter of a width-modulation of the horizontal synchronizing pulses; for example, so that alternate pulses differ in width by a time $1/(2f_d)$; then in alternate line periods the timing of color switching and beam blanking becomes as shown by graphs 31 and 33, instead of graphs 11 and 13 respectively. With an odd number of lines per frame (e. g., 525, the present U. S. standard), the same difference occurs between successive sweeps along any given horizontal line (at intervals of half a frame period), so that the color dots displayed on any line of screen 2 during one sweep fall midway between those displayed there during the previous sweep. This arrangement serves to fill in the tiny gaps left by blanking the beam between dots of different color.

The nominal number of dots of each color per line should be an integer. Without dot interlace, the number ($f_d/f_h$) might be any integer; with 2:1 dot interlace the number ($2f_d/f_h$) should be odd. Such a rational relation is advantageous, both at the transmitter and at the receiver, because it makes possible several different substitutes for the synchronized oscillator shown in Figure 4. In particular, it facilitates the use of a continuously-operating oscillator or frequency multiplier to generate the color-distribution frequency, $f_d$, because it makes the phase relation between the desired oscillations in successive line intervals exactly what would occur naturally in case of a continuous oscillation at frequency $f_d$. Without attempting to describe the various possibilities, we point out that they exist, and that the application of our invention is not limited to receivers employing a circuit of the type shown in Figure 4.

*Auxiliary-deflection amplifier*

In a tube with horizontal-striped screen, power requirements of the auxiliary deflection system are very small, since the beam need only be displaced a little more than its own width at the screen. With a finned screen, considerably more power is required. The angular deflections required for color selection are larger; there are two sets of auxiliary coils instead of one; the magnetic field of the second set (35, 35′) must be stronger than that of the first (10, 10′), producing a larger angular deflection of the beam; and being near the large end of tube 1, coils 35, 35′ have a relatively large space to energize, which further increases their power needs. In a typical case, coils 35, 35′ may require 100 times as many ampere-turns as coils 10, 10′, to maintain the proper ratio of deflection; and with frequency $f_d$ in the neighborhood of 4 mc./s., the power dissipated due to resistance of coils 35, 35′ may be 20 or 30 watts even though the corresponding power for coils 10, 10′ is only 3 or 4 milliwatts. The total power requirements then are large enough to warrant careful consideration of circuit efficiency. High-frequency coils must have relatively few turns, and therefore require relatively large currents to produce the desired deflections. The tubes of amplifier 9, on the other hand, are low-current devices; but the coil requirements may be matched to the amplifier capabilities by an arrangement such as that shown in Figure 8, where auxiliary deflection coils 10, 10′, 35, 35′ are connected as one inductive branch of a double-tuned circuit.

Figure 8:
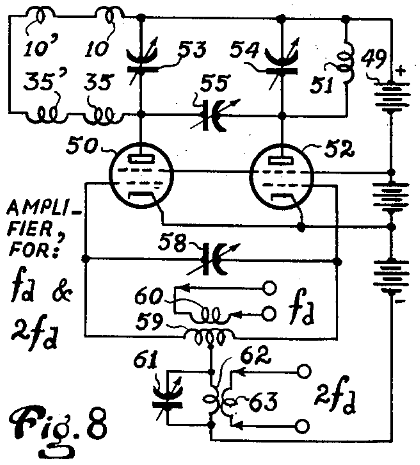
Figure 8 is a schematic diagram of an amplifier suitable for driving the color-switching means in a dot-sequential television receiver.

Figure 8 shows all of these coils connected in series, but that is not an essential feature. Among other possibilities, they all might be connected in parallel; coils 10 and 10′ might be connected in parallel with each other but in series with coils 35 and 35′; or coils 10 and 10′ might be connected to taps on coils 35 and 35′. Because of differences in current distribution, each combination of connections will require a different coil design to produce the proper relation between the two opposite deflections; but the combination of coils may be treated as one coil so far as the amplifier is concerned.

The combination of coils 10, 10′, 35, 35′ is connected from the positive terminal of D.-C. power source 49 to the anode of tube 50. Another coil, 51, having substantially the same inductance (and, incidentally, resistance) as the combination of auxiliary-deflection coils, is connected from the same D.-C. power source to the anode of amplifier tube 52. Capacitances 53 and 54, which are substantially equal, tune the two equal inductances to the same frequency—in this case, $2f_d$. Capacitance 55 tunes the push-pull combination of the two previously-mentioned tuned circuits to a lower frequency, and is adjusted to make that lower frequency $f_d$. Thus for push-pull operation of amplifier tubes 50 and 52 their combined anode-load circuit presents a high resistance at frequency $f_d$, while for parallel operation of the two tubes (capacitor 55 being inactive then because both its terminals are at the same potential) each side of the anode-load circuit presents a high resistance at frequency $2f_d$. Oscillator 7 (Figure 1 or Figure 5) energizes at frequency $f_d$ a primary coil 60 coupled magnetically to center-tapped secondary coil 59. The latter is tuned to frequency $f_d$ by capacitor 58, and its voltage is applied in a push-pull arrangement to the control grids of tubes 50 and 52. Frequency doubler 8 energizes at frequency $2f_d$ a primary coil 63 coupled magnetically to a secondary coil 62. The latter is tuned to frequency $2f_d$ by capacitor 61, and its voltage is applied through the center-tap of coil 59 to the two control grids in parallel.

By the arrangement just described, the amplifier tubes are made to take full advantage of the double resonance (at frequencies $f_d$ and $2f_d$) of their anode-load circuit, and produce a large voltage at each frequency across the auxiliary deflection coils 10, 10′, 35′ and 35. Because of resonance, the coil currents greatly exceed the anode currents of tubes 50 and 52; and this gain (some 100-fold) more than compensates for the fact that approximately half the power output of the amplifier, at frequencies $f_d$ and $2f_d$, is dissipated in coil 51. In general, tuning the anode circuit of amplifier 9 is advantageous when auxiliary deflection requires more current than can be supplied by a reasonably small amplifier tube; otherwise a single-tube amplifier would suffice, and tube 52, coil 51 and capacitors 53, 54, 55 could be eliminated. When the current requirements are high enough to make tuning advantageous, but the power requirements are relatively low, either tube 50 or tube 52 may be omitted from the circuit of Figure 8. If the remaining tube will endure such treatment, re-adjustment of its grid voltages (D.-C. and A.-C.) to double its A.-C. plate current will enable it to produce substantially the same output as the two tubes would.

*Other applications*

Besides the dot-sequential system outlined above, there have been proposed television systems in which the colors are switched at much lower frequencies. In a line-sequential system, the transmitted signals represent picture data for a horizontal line of each primary color in turn, so that the time interval devoted continuously to one color is the same as the interval required for scanning once across the width of the picture. In a field-sequential system, the transmitted signals represent picture data for a field of each primary color in turn, the interval devoted continuously to one color being the same as the interval required for scanning once from top to bottom of the picture. Fundamental frequencies of color switching for typical examples of these systems are 15,750 and 20 cycles per second, respectively; that is, 15,750 sets of 3 lines per second, or 20 sets of three fields per second, with one line or field of each primary color in each set of three.

Figure 1:
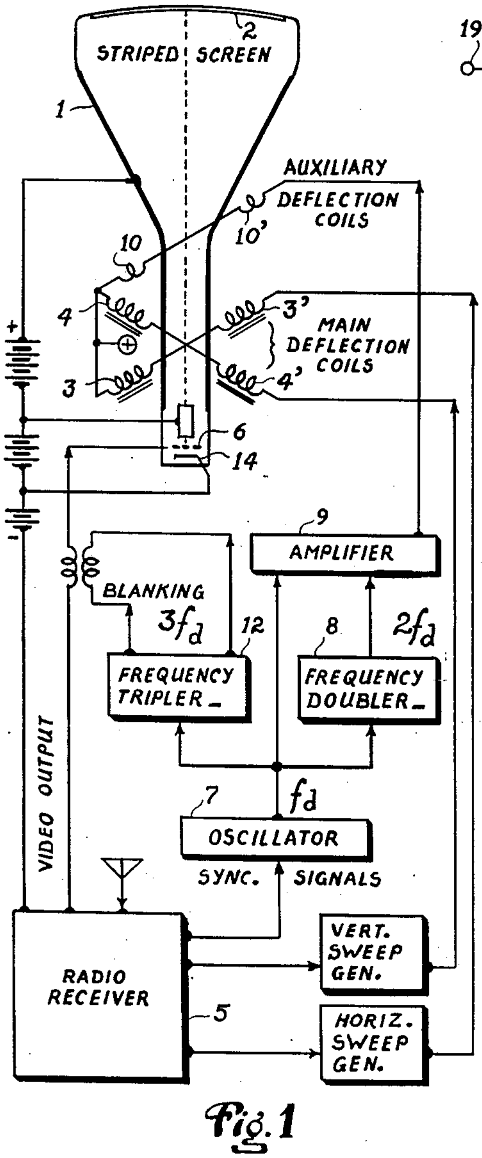
Figure 1 is a schematic diagram of a color-television receiver employing a picture tube with striped screen.

With a line-sequential system, the arrangement shown in Figure 1 can be simplified considerably: all the circuits involving frequencies $f_d$, $2f_d$ or $3f_d$ can be eliminated; and auxiliary deflection coils 10, 10′ can be eliminated too. For a specified number of 3-colored lines in the picture, the horizontal-sweep frequency in this case will be three times the value required in either dot-sequential or monochrome systems; and the scanning raster will have three times the usual number of lines. By appropriate adjustment of vertical-sweep amplitude, this raster can be so fitted to the stripes of the screen that the path of the scanning spot follows the centerline of each successive stripe. Since successive stripes have different colors, in exactly the sequence required for color switching, the picture produced on the screen will follow the color scheme of the transmitted picture-data signals (which are detected and applied to control grid 6 of cathode-ray tube 1, in a conventional manner). Any of the well-known methods of position adjustment (e. g., D.-C. bias applied to vertical deflection coils 4, 4′) can be used, if necessary, to correct the phase of color switching, so that (for example) the beam strikes a blue stripe rather than a red or a green stripe when the transmitted signal represents blue. For systems based on more than three colors, the same principles may be employed with correspondingly more colored stripes. Line interlace may be used, as in monochrome systems, provided the interlace ratio and the number of colors are relatively prime (no common factors).

The same simplification of Figure 1 is possible with a field-sequential system, if the standards adopted for that system provide a color-line interlace ratio that is a multiple of the number of colors; for example, 3:1 or 6:1 in a three-color system. For a 3:1 ratio, the nominal number of lines per field ($f_h/f_v$) differs by ⅓ from the nearest integer. Then the lines scanned in one field fall between lines scanned in the two preceding fields, with a relative displacement ⅓ the spacing of lines in each field. By proper adjustment of the vertical-sweep amplitude and vertical centering, the raster can be so fitted to the stripes on the screen that the path of the beam sweeps along the center line of each successive stripe of a certain color in one field, each successive stripe of another color in the second field, and each stripe of the third color in the final field of each frame. For a 6:1 interlace ratio, the nominal number of lines per field ($f_h/f_v$) differs by 1/6 from the nearest integer, and there are six fields per frame. The path of the scanning spot follows the center lines of the odd stripes of a different color in each of three successive fields, then follows the even stripes of corresponding colors in the next three fields.

In a field-sequential system not using sweep-frequency ratios as convenient as those just mentioned, the regular scanning arrangement will not accomplish color switching automatically, even in a picture tube with striped screen; and auxiliary deflection becomes advantageous for that purpose. However, some simplification of Figure 1 is still possible. Since standard video signals include blanking pulses between fields, at the times that would be natural for color switching in a field-sequential system, no additional blanking is necessary; and tripler 12 of Figure 1 need have no counterpart in this case. Auxiliary deflection can be given very nearly the ideal waveform shown in Figure 9, by means of a combination of multivibrators synchronized with the vertical-sweep generator. One such combination has been shown by Huffnagel in U. S. Patent No. 2,389,979. Whether the circuit used to drive auxiliary deflection coils 10, 10′ be Huffnagel's or some other, it can take the place of three items in Figure 1: oscillator 7, doubler 8 and amplifier 9. The basic time interval (T) in Figure 9 will be ($3/f_v$) three vertical-sweep periods, since one step of the rectangular wave occurs for each field.

Figure 9:
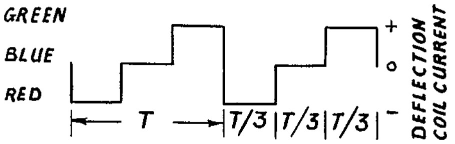
Figure 9 shows waveforms used for color switching in a line-sequential or a field-sequential color television system.

Auxiliary deflection is always required for color switching in a picture tube with finned screen; but for either a line- or a field-sequential system the circuit illustrated in Figure 5 can be simplified. One item—frequency tripler 12—can be omitted completely, since no auxiliary blanking is required. Standard video signals already include blanking pulses between lines and between fields, at the times when transitions from one color to another would occur. Three other items—oscillator 7, doubler 8 and amplifier 9—can be replaced by a step-wave generator operating at the appropriate color-switching frequency. Figure 9 shows the ideal waveform for auxiliary deflection in this case. At the low frequencies required in a line- or field-sequential system, this wave can be approximated very closely (in practice, much more closely than is necessary for color-switching purposes) by a combination of unsymmetrical multivibrators. Suitable combinations have been shown elsewhere, and are no part of our invention. For a line-sequential system, the step-wave generator driving the auxiliary deflection coils (10, 10′, 35′, 35) is synchronized with the horizontal-sweep generator; and the basic time interval (T) in Figure 9 is ($3/f_h$) three line periods. For a field-sequential system, the step-wave generator is synchronized with the vertical-sweep generator; and interval T is $3/f_v$, three field periods.

*Magnetic focusing*

The previous discussion of paths followed by the electron beam has assumed that the beam was focused by an electrostatic lens system. If magnetic focusing is employed, the beam paths become a little more complicated, though the end results are similar. The most common arrangement uses a short coil, or a permanent magnet between two annular pole pieces, around the neck of the cathode-ray tube. Its magnetic field is largely concentrated in the region between cathode and main deflection coils, although it does have some influence throughout the tube, including the region between deflection coils and screen. There the magnetic influence gradually twists the beam path around the axis of the tube, making it a helical arc instead of a straight line. Since the angle of twist is substantially the same for all beam paths, it can be compensated by rotating the deflection coils around the tube axis in the opposite direction.

When a bent path is desired, as in Figure 5, with a change of direction but no net change in position at the screen, magnetic focusing can be arranged to serve an extra purpose, reducing by a factor of 10 or 20 the power required for auxiliary deflection. To do this, the first set of auxiliary deflection coils (10, 10′) is mounted close to the cathode; the center of the focusing magnet is placed between those coils (10, 10′) and the main deflection coils (3, 3′, 4, 4′); and the second set of auxiliary deflection coils (35, 35′) is placed some distance back from the screen 34, perhaps half way to the neck of the tube. The focusing magnet is made fairly long, so as to produce a moderate magnetic field through most of the region between the two sets of auxiliary deflection coils, rather than a very strong field in a shorter space. When adjusted to focus the cathode ray into a small spot on the screen, the magnetic field produces more than 180° twist in the beam path between the two sets of auxiliary deflection coils. If the beam is deflected by coils 10, 10′, it follows a helical path making a little more than a half turn before it passes coils 35, 35′, and begins to turn back toward its original (undeflected) path even before being influenced by the latter coils; consequently, they need supply only a relatively small deflecting force in order to neutralize the effect of the first set on the position where the beam will strike the screen. The direction of the required force generally will not be aligned with either the fins of screen 34 or the direction of the corresponding force applied by coils 10, 10′, nor yet with the direction of transverse beam velocity at the screen; but it will remain fixed as long as the focusing magnet does so; and the magnitude of force required from coils 35, 35′ can be made even smaller than that from coils 10, 10′.

The saving from use of magnetic focusing as just described is limited by three factors. First, in order to reduce the deflecting force required from coils 35, 35′ and still maintain the desired transverse velocity at the screen, the deflecting force required of coils 10, 10′ must be increased; and there is no advantage in carrying such modification beyond the point where the two sets of coils require equal power from amplifier 9. Second, if the deflecting force of coils 10, 10′ were made too large, the beam might strike the wall of the tube. Third, although the deflecting force required of coils 35, 35′ could be reduced by extending the high-intensity portion of the focusing field beyond them, this field must be kept mostly within the neck of the tube to avoid materially reducing the deflection sensitivity for coils 3, 3′, 4, 4′. Usually the first factor will govern design, the other two being easily accommodated.

While we have shown particular arrangements of our invention, many minor changes therein can be made without departing from the spirit and scope of the invention.

We claim:

1. In a cathode-ray picture tube, a three-color screen comprising the following: A translucent base plate; a multiplicity of opaque fins, substantially parallel to each other, with one edge of each fin adjacent to the plate; a thin metallic film covering the gaps between fins at the edges away from the base plate, said film being nearly transparent to cathode rays but an efficient reflector for light; a coating on the base plate, between fins, adapted to radiate light of one color when excited by electrons, as it will be if cathode rays arrive in a direction nearly edgewise to the fins; a coating on one side of each fin adapted to radiate light of a second color when struck by electrons, as it will be if cathode rays arrive from a direction nearer that side; a coating on the opposite side of each fin adapted to radiate light of a third color when struck by electrons, as it will be if cathode rays arrive from a direction nearer said opposite side; the aforesaid fins being wide in comparison to their spacing so as to shade the base plate from any rays whose incidence angle, with respect to the edgewise direction of the fins, exceeds some moderately small limit.

2. In a color television system employing a cathode-ray picture tube: A finned color screen, as in claim 1, placed with its fins edgewise to the normal direction of arrival of the electron beam at the screen; deflecting means, capable of making the electron beam deviate from its normal path; restoring means, active in a region between said deflecting means and the screen, capable of turning the deflected beam back toward its normal path; means for energizing said deflecting and restoring means in the proportions required to make the beam intersect its normal path at the screen; and means for control of said energizing means to change the angle of incidence of the beam with respect to the fins, thereby to change the color of light emitted from the screen.

3. In a dot-sequential color television system: A cathode-ray tube with striped three-color screen; means for deflecting the beam to scan a raster with lines falling upon stripes of one color only; means for deflecting the cathode ray additionally by small amounts, to make it impinge upon stripes of other colors; means for generating oscillations at the fundamental color-sequence frequency; means for doubling that frequency; means for energizing the aforesaid additional deflecting means simultaneously at the fundamental frequency and at twice that frequency, the relative amplitude and phase of the two components being adjusted to make the resultant deflection vary in a step-wise manner with three steps per fundamental cycle, the steps being of suitable magnitude to bring the cathode ray successively to stripes of three different colors; means for tripling the fundamental frequency; and means for extinguishing the cathode ray at the triple frequency, phased to make the ray-less periods occupy the major portion of each successive transition interval between steps of color-selecting deflection.

4. In a dot-sequential color television system: A cathode-ray tube with its screen subdivided into long, narrow elementary areas, or stripes, each adapted to emit light of a particular color when excited by cathode rays, stripes of one color being co-planar while stripes of other colors are on fins mounted edgewise to the first; means for deflecting the cathode ray to scan a raster on the screen; means for bending the path of the cathode ray and thereby changing its angle of incidence upon the screen; means for generating oscillations at the fundamental color-sequence frequency; frequency-doubling means excited by said oscillations; means for energizing the aforesaid path-bending means simultaneously at the fundamental frequency and at twice that frequency, the relative amplitude and phase of the two components being adjusted to make the resultant variation of incidence angle of the cathode ray at the screen approximate a stair-step function of time, with three steps per fundamental cycle; frequency-tripling means excited by the fundamental-frequency oscillations; and means for extinguishing the cathode ray at the triple frequency, phased to make the ray-less periods occupy a major part of each successive transition between the steps that correspond to different colors at the screen.

5. In a dot-sequential color television system: A cathode-ray tube with its screen subdivided into many elementary areas, each such area being substantially as large as the screen in one direction but very narrow in a perpendicular direction, and adjoining areas being adapted to emit light of different colors when excited by cathode rays; means for deflecting the cathode ray to scan a raster on the screen; means for deflecting the cathode ray additionally and making it strike elementary areas of one color or another according to the magnitude and direction of such additional deflection; means for generating oscillations at the fundamental color-selection frequency; frequency-doubling means excited by said oscillations; means for energizing the aforesaid additional deflecting means simultaneously at the fundamental frequency and at twice that frequency, the relative amplitude and phase of the two components being adjusted to make the resultant deflection vary in a step-wise manner with three steps per fundamental cycle, the steps being of magnitude suitable for color selection; frequency-tripling means excited by the fundamental oscillations; and means for extinguishing the cathode ray at the triple frequency, phased to make the ray-less periods occupy the major portion of each successive transition interval between colors.

6. In a dot-sequential color television system where color switching is controlled by oscillations of a predetermined frequency, the following arrangement for synchronizing such oscillations at the receiver with their counterpart at the transmitter: An electron-tube including a plate, a grid and a cathode; a feed-back circuit between plate and grid thereof including a piezoelectric crystal, so that the tube will generate oscillations at a frequency controlled by said crystal; a second electron tube having its anode and cathode connected in parallel with those of the first tube but its control grid separate; and a capacitance-resistance coupling to that separate control grid from a point in the receiver video circuit that makes available signals including positive synchronizing pulses, the coupling resistance and capacitance being of values appropriate for providing grid-leak bias to the second tube, the amplitude of the video signals being sufficient to make such bias prevent anode current in the second tube except during the positive synchronizing pulses, the effective resistance loading imposed on the oscillator circuit by the second tube when its anode conducts being sufficient to stop oscillations, and the abrupt cessation of current to the anode of the second tube at the end of each synchronizing pulse being sufficient stimulus to initiate oscillations with an amplitude that can be maintained thereafter by the first tube.

7. The following arrangement for controlling independently the angle of incidence and the position of an electron beam at its terminus: means for producing a transverse field, electric or magnetic, near the source of the beam, to deflect the beam from its initial direction; means for producing a longitudinal magnetic field, substantially parallel to the average direction of the beam in the region through which the beam passes after the aforesaid deflection, so that the transverse velocity of the beam electrons will be rotated progressively as they advance; means for adjusting the intensity of said longitudinal field to twist the path of the deflected beam enough to intersect, at its end, the path the beam would have followed if not deflected; means for producing a second transverse field, farther along the path of the beam than the first, to deflect the beam after an appreciable part of the aforesaid path-twisting action has been accomplished, so that the magnitude of transverse displacement of the beam, at its terminus, due to the second deflection is not greatly reduced by the twist effect, and the second deflection can control the final transverse position of the beam.

8. The following arrangement for controlling independently the position and the angle of incidence of an electron beam upon the target or screen that ends its flight: First means for deflecting the beam, to control its final incidence angle; second deflecting means, to control its final position; means for deflecting the beam a third time, in proportion to the first deflection but in a different direction; means for producing a longitudinal magnetic field, substantially parallel to the average direction of the beam between the first two deflections; means for adjusting the intensity of this magnetic field to the value requisite for focusing the beam; the relative direction of the first and third deflections being adjusted to make opposite the direction, after twisting by the longitudinal magnetic field, of their individual effects on final beam position; and the relative magnitude of the first and third deflections being adjusted to make their effects equal in magnitude, so that in combination with the longitudinal magnetic field they have substantially no net effect on final beam position, but only on the final incidence angle of the beam.

9. The following arrangement for controlling independently the position and angle of incidence of an electron beam at the end of its flight: Means for producing a transverse field, selected from the group consisting of magnetic fields and electric fields, to deflect the beam from its initial direction, thereby to control its final incidence angle; means for producing a second transverse field selected from said group, to deflect the beam for control of its final position; means for producing a longitudinal magnetic field, substantially parallel to the average direction of the beam and concentrated chiefly in the region between the two transverse fields, whereby the path of the beam will be twisted progressively around the longitudinal axis of the magnetic field as it advances, but relatively little of the twist will occur after the second deflection; and means for adjusting the intensity of the longitudinal magnetic field to a value that will make the twisted path of the beam, when deflected by the first transverse field, intersect at its end the path the beam would have followed in the absence of said first transverse field.

10. In the deflection system of a cathode-ray tube, for color television or the like, where deflection is required simultaneously at two frequencies: Inductance means and capacitance means, connected in parallel, adjacent to the path of the cathode ray with the field of one of them crossing that path; a second inductance means and a second capacitance means, connected in parallel with each other, and connected at one terminal to the first-named means, but otherwise separated from the first named means so that their fields do not cross the path of the cathode ray; one means in each of the aforesaid pairs being adjustable for tuning purposes, so that they can be tuned to one of the required frequencies; and an adjustable reactance, connecting the two tuned circuits aforesaid, whereby the combination may be tuned to the other of the required frequencies.

11. In a dot-sequential color television system: A cathode-ray tube; a screen therein subdivided into strip-like elementary areas, adjoining areas being adapted to emit light of different colors when excited by cathode rays, and being disposed to receive selectively cathode rays incident upon the screen at different angles; means for producing a cathode ray and directing it toward said screen; means for deflecting the ray, near its source; means for producing a magnetic field substantially parallel to the average direction of the ray, whereby the path of the deflected ray may be twisted to meet the screen at a position substantially independent of the aforesaid deflection, with incidence angle dependent on said deflection; means for deflecting the cathode ray again, after an appreciable part of the twisting action has been accomplished; means for controlling the second deflection means to make the cathode ray scan a raster on the screen; means for generating oscillations at the fundamental color-selection frequency; frequency-doubling means excited by said oscillations; means for energizing the first-mentioned deflecting means simultaneously at the fundamental frequency and the double frequency, thereby to vary the incidence angle of the ray upon the screen in a step-wise manner suitable for color selection, with three steps per fundamental cycle; frequency-tripling means excited by the fundamental oscillations; and means for extinguishing the cathode ray at the triple frequency, so that a ray-less period covers the major part of each successive transition between colors.

12. In a color-television receiver: A cathode-ray tube; a direction-sensitive color screen therein, adapted to produce selectively light of different colors according to the direction of incidence of electrons striking it; means for producing a cathode ray and directing it toward said screen; deflecting means, near the cathode-ray source, controllable to deflect the ray selectively in different directions according to the color to be displayed; means for producing a magnetic field directed generally along the axis of the ray, thereby twisting the path of the deflected ray so that the ray may strike the screen at substantially the same point as if not deflected, said magnetic field being concentrated in a region adjacent to said deflecting means; and second deflecting means, affecting the ray in a region between the first deflecting means and the screen, so as to control the transverse position of the point at which the ray strikes the screen.

13. In a color-television receiver: A cathode-ray tube; a direction-sensitive color screen therein, adapted to produce selectively light of different colors according to the direction of incidence of electrons striking it; means for producing a cathode ray and directing it toward said screen; deflecting means, near the cathode-ray source, controllable to deflect the ray selectively in different directions according to the color to be displayed; means for producing a magnetic field directed along the undeflected path of the ray, in a region immediately following said deflecting means; second deflecting means, at the screenward end of said region of concentrated magnetic field, whereby the ray may be directed selectively to any point on the screen; third deflecting means, between the second deflecting means and the screen; and means for exciting said third deflecting means in a proportion and direction fixed relative to the excitation of the first deflecting means, so that said first and third deflections in combination effectively determine the direction of incidence of the ray upon the screen but neutralize one another in regard to the position at which the ray meets the screen.

14. In a television receiver: A cathode-ray tube; a direction-sensitive color screen therein, adapted to produce selectively light of different colors according to the direction of incidence of electrons striking it; means for producing an electron beam and directing it toward said screen; beam-deflecting means adjacent to said beam-producing means; means for producing a magnetic field directed generally along the axis of the beam, said field being concentrated in a region traversed by the beam immediately after said deflection; and additional beam-deflecting means between said region of concentrated axial magnetic field and said screen.

15. In a television receiver: A cathode-ray tube; a direction-sensitive color screen therein, adapted to produce selectively light of different colors according to the direction of incidence of electrons striking it; means for producing an electron beam and directing it toward said screen; beam-deflecting means adjacent to said beam-producing means; means for producing a magnetic field directed generally along the axis of the beam, said field being concentrated in a region traversed by the beam immediately after said deflection; second deflecting means, independent of the first, between said region of axial magnetic field and said screen; and third deflecting means, between said second deflecting means and said screen, excited in proportion to the excitation of the first deflecting means, but oppositely directed.

References Cited in the file of this patent

UNITED STATES PATENTS

| Number | Name | Date |
|---|---|---|
| 2,296,908 | Crosby | Sept. 29, 1942 |
| 2,416,056 | Kallman | Feb. 18, 1947 |
| 2,431,115 | Goldsmith | Nov. 18, 1947 |
| 2,446,440 | Swedlung | Aug. 3, 1948 |
| 2,461,515 | Bronwell | Feb. 15, 1949 |
| 2,529,485 | Chew | Nov. 14, 1950 |
| 2,532,511 | Okolicsanyi | Dec. 5, 1950 |